April 25, 1950 W. R. KOCH 2,505,361
FACSIMILE RECEIVING SYSTEM
Filed April 27, 1946
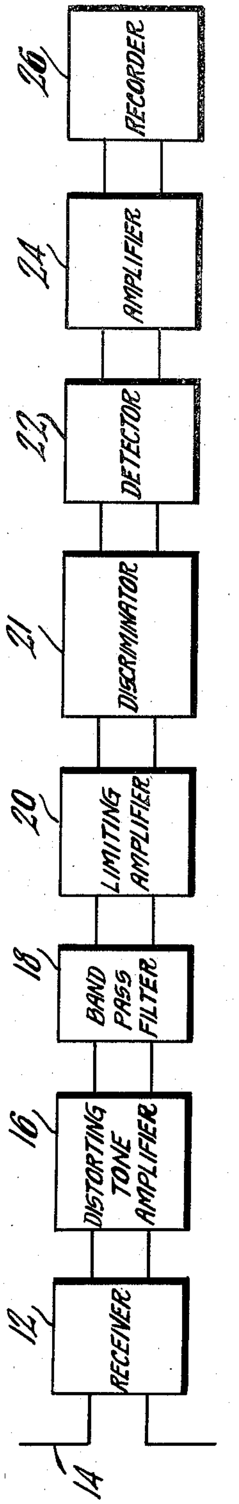
INVENTOR
Winfield R. Koch
BY H. S. Grover
ATTORNEY Patented Apr. 25, 1950 2,505,361

UNITED STATES PATENT OFFICE 2,505,361

FACSIMILE RECEIVING SYSTEM

Winfield R. Koch, Haddonfield, N. J., assignor to Radio Corporation of America, a corporation of Delaware Application April 27, 1946, Serial No. 665,382

1 Claim. (Cl. 178—5)

The present invention relates to facsimile signalling systems and more particularly, but not necessarily exclusively, to a receiving and recording system for producing records in facsimile from a frequency modulated carrier.

In a facsimile system in which a frequency modulated sub-carrier is transmitted, selective fading may occur resulting in the selective cancellation or attenuation of the main carrier and either side-band. In accordance with the usual procedure for obtaining recordings in facsimile from such a signal, the sub-carrier after detection is amplified and put through a discriminator circuit. The output of the discriminator circuit is detected and amplified before it is applied to a facsimile recorder. If the carrier fades, only a sub-carrier of double the frequency of the original will be present at the sub-carrier amplifier and the recorder will fail to function during the period of fading. The present invention has for its primary object to provide a novel arrangement for overcoming this fading difficulty so that selective fading will have no appreciable influence on the reproduced copy.

The invention herein disclosed is an improvement of the system disclosed and claimed in U. S. Patent No. 2,277,261 granted to J. E. Smith on March 24, 1942.

Accordingly, another object of the invention is to provide an improved system for avoiding the effect of selective fading in a facsimile receiving system by deriving or generating a second harmonic of a frequency modulated sub-carrier after transmission, reception and detection of a main radio frequency carrier to recover the sub-carrier.

Other objects will appear in the following description, reference being had to the accompanying drawing which shows schematically a receiving circuit arranged to function in accordance with the present invention.

The receiving station shown in the single figure of the drawing, which operates in accordance with the invention, comprises a radio receiver 12 of any well-known type which will demodulate the carrier radiated from a transmitting station. The transmitting station provides a radio frequency carrier modulated by a frequency modulated sub-carrier for transmission. A complete transmitting system which operates to provide image intelligence signals of the kind referred to is shown in full detail in U. S. Patent No. 2,326,740 granted to Maurice Artzt on August 17, 1943. The receiver 12 is fed from an appropriate signal input source, such as an antenna 14, and includes radio frequency amplifiers, a detector, audio frequency amplifiers, and any other desired device for converting the signals into audio frequencies of the desired intensity.

The output of the receiver 12 is furnished to a distorting tone amplifier 16 which may be of any desired kind or type known in the art for generating harmonic components of each of the frequencies impressed on its input circuit. This amplifier may, for example, be a vacuum tube which is operated on a curved portion of its characteristic or it may include a signal distorting network and the harmonic components of the impressed frequencies are selected by a band-pass filter 18.

In the description of the operation of the receiving station shown in the drawing, a frequency range of operation will be assumed and described by way of example. For the present it is sufficient to note that the band-pass filter 18 selectively passes those frequencies which are second harmonics of the desired input frequencies applied to the distorting amplifier 16. In general, the band-pass filter 18 has a characteristic such that it will exclude the frequency band of the fundamental of the sub-carrier frequency and will pass the band of the second harmonic thereof. The reason for this will appear later in connection with the explanation of the operation of the system.

The output from the band-pass filter 18 passes through a limiting amplifier 20 to a discriminator 21. The discriminator 21 may be of any desired type which converts the frequency modulation of the harmonic frequencies at the output of the filter 18 into amplitude modulation which is rectified by a rectifier or detector 22. The rectified signal from the detector 22 is substantially a replica of the signal produced by scanning the subject copy at the transmitter (not shown) and may be amplified, if desirable or necessary, by an amplifier 24 before being applied to a recorder 26.

A suitable frequency detector or discriminator is shown in the Artzt Patent No. 2,326,740 and in the Smith Patent No. 2,277,261 both referred to above. The facsimile recorder indicated schematically at 26 may be of any kind such, for example, as the carbon paper recorder shown in reissue Patent No. Re. 20,152 granted to C. J. Young on October 27, 1936, or alternatively it may be of the electro-chemical or photographic type which are each well known. The general features of suitable equipment such as the discriminator 21 and the detector 22 are shown and discussed in the "RCA Review" for October 1939 on pages 131 to 153 in an article entitled "Radio facsimile by sub-carrier frequency modulation."

The operation of the receiving station will now be described. The received signal at the antenna 14 is in the form of a radio frequency carrier amplitude modulated by a frequency varying sub-carrier or tone. Frequency variations in this sub-carrier are produced in accordance with the light and shade characteristics of the piece of subject copy at the transmitter. The Artzt patent referred to above explains in detail the production of such a frequency modulated sub-carrier. It will be assumed, as an illustrative example, that the sub-carrier or tone at the transmitter is modulated in frequency so that for white copy the frequency will be 4 kc. and for black copy the frequency will be 3 kc. The receiver 12 will recover this frequency modulated sub-carrier by any well known amplitude detection process and the distorting amplifier 16 will be operated so as to give harmonic components between 6 kc. and 8 kc. The band-pass filter 16 in the illustrative example under discussion will pass frequencies in the range between 6 and 8 kc. but will almost completely attenuate frequencies lying outside of this range. The selected frequencies, which are harmonics of the frequency produced when the transmitted subject copy is scanned, are amplified and limited in the limiting amplifier 20 so that all of these components are of approximately the same amplitude. This limiting process will eliminate spurious amplitude modulation. The discriminator 21, the detector 22 and the amplifier 24 operate in the usual manner to provide signals for operation of the receiver except that in the present invention the discriminator 21 will operate at frequencies which are harmonics of the sub-carrier frequency.

The system of the invention operates to eliminate the effect of selective fading in the following manner. Under normal conditions of signal reception the 3 kc. to 4 kc. tone will operate the recorder 26 satisfactorily. For example, when the frequency of the sub-carrier is 3 kilocycles representing black copy, the distorting tone amplifier 16 will produce the second harmonic frequency of 6 kilocycles to be passed through the limiting amplifier 20. The amplitude modulated signal from the discriminator 21 is rectified at the detector 22 and after amplification causes the recorder to mark a record sheet or the like.

When selective fading occurs, either the sub-carrier or one of the tone side-bands may be selectively attenuated or the carrier may be selectively attenuated. Attenuation of more than one frequency at a time by fading is comparatively rare. In a receiving station not embodying the apparatus of the invention, if the carrier fades only a tone of double frequency will be present on the tone amplifier and the recorder will not produce marks during the time of fading. In a receiving station of the present invention when selective fading occurs of such nature that either tone side-band is selectively attenuated, a tone will still occur at the output of the receiver through the beating of the remaining side-band and the carrier. If the carrier is selectively attenuated the two side-bands will beat together giving a tone frequency between 6 kc. and 8 kc., with the frequencies assumed by way of example. This tone frequency will be amplified by the amplifier 16 and will be passed by the band-pass filter 18. Harmonic frequencies produced at the distorting amplifier 16 will be suppressed by the band-pass filter.

A distinct advantage of the receiving system of the invention is that better detection of the tone can be secured, and the low frequency components to operate the recorder 26 can be more easily separated from the sub-carrier or tone at the output of the tone detector because of the higher effective carrier frequency relative to the low frequency components. Thus, a half-wave rectifier may be used as the tone detector 22 where a full-wave rectifier may be needed when the distorting tone amplifier 16 is omitted.

Having now described the invention, what is claimed and desired to be secured by Letters Patent is the following:

A receiving system in the form of a single branch circuit for receiving a modulated radio frequency carrier, modulation of which is produced by a frequency modulated tone, comprising means for deriving the frequency modulated tone from the radio frequency carrier by demodulation, an amplifier for producing distortion of the frequency modulated tone, a band-pass filter for transmitting frequencies produced by distorting the modulated tone, a frequency detector for converting the frequencies produced by distorting the modulated tone to an amplitude modulated tone, a half-wave rectifying detector for obtaining a direct current voltage from the output of said frequency detector, and a facsimile recorder operated by the output of said rectifying detector.

WINFIELD R. KOCH.

REFERENCES CITED

The following references are of record in the file of this patent:

UNITED STATES PATENTS

| Number | Name | Date |
|---|---|---|
| 2,257,282 | Smith | Sept. 30, 1941 |
| 2,269,594 | Mathes | Jan. 13, 1942 |
| 2,306,687 | Cox | Dec. 29, 1942 |